(No Model.)

P. GEISER.
PLASHED HEDGE FENCE.

No. 421,132. Patented Feb. 11, 1890.

WITNESSES:
Paul Johst
C. Sedgwick

INVENTOR:
P. Geiser
BY
Munn & Co.
ATTORNEYS.

UNITED STATES PATENT OFFICE.

PETER GEISER, OF WAYNESBOROUGH, PENNSYLVANIA.

PLASHED HEDGE FENCE.

SPECIFICATION forming part of Letters Patent No. 421,132, dated February 11, 1890.

Application filed June 22, 1889. Serial No. 315,164. (No model.)

*To all whom it may concern:*

Be it known that I, PETER GEISER, of Waynesborough, in the county of Franklin and State of Pennsylvania, have invented a new and useful Improvement in Plashed Hedge Fences, of which the following is a full, clear, and exact description.

This invention relates to that description of line hedge fences in which the twigs or canes of the plants are bent down in the plane of the fence and secured in such position by special wires or devices arranged diagonally or horizontally and sometimes combined with upper horizontal line wires or strands, the whole constituting what is known as a "plashed" hedge fence.

My invention has for its object to construct a hedge fence by plashing in a cheap and more systematic and perfect manner than has heretofore been done; and it consists in connecting the upper ends of the canes by means of a horizontal rod or rail formed in sections and having spliced connections with each other; and it further consists in certain novel constructions, arrangements, and attachments of the wires used in the production of a hedge fence, substantially as hereinafter described, and pointed out in the claims.

Reference is to be had to the accompanying drawings, forming a part of this specification, in which similar letters of reference indicate corresponding parts in all the figures.

Figure 1:
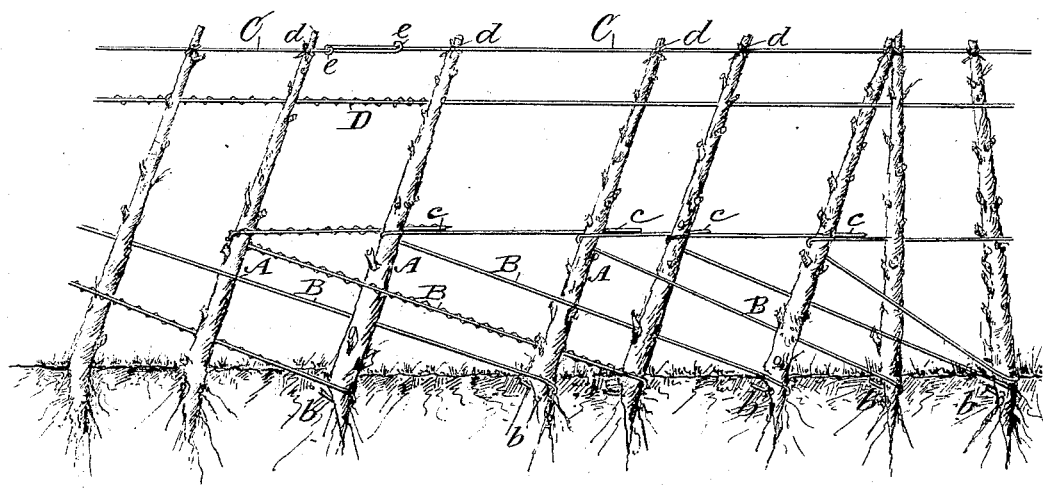
Figure 2:
Figure 3:
Figure 4:

Figure 1 represents a side view of a plashed hedge fence in part embodying my invention; and Figs. 2, 3, and 4 represent longitudinal views of various splicing-connections, modifications of one another, for uniting a sectionally-constructed wire rail or strand used on the fence.

In the construction of the fence I draw the trimmed-out canes or stalks A of the plants to their desired inclined position and secure them in such position by a series of either barbed or plain wire bracing-strands B, provided with hooks *b*, having an open end made to loosely embrace the bases or roots of the canes at or slightly under the surface of the ground in preference to engaging them with a horizontal strand, and dispensing with nails or staples driven in the canes, as is sometimes practiced, and from this point of direct connection with the canes said hooked wires B are passed diagonally or obliquely upward alternately on opposite sides of adjacent canes at a given height or distance from the ground, and are then bent around certain of the canes and passed back in horizontal directions and interlapped without fastening on opposite sides of adjacent canes—as shown at *c*, for instance—thus giving freedom to the plant in growing by the loosely-lapped bracing-wire being free to open as the plant expands. This construction, arrangement, and application of the hooked wires B not only dispenses with a lower horizontal strand, but readily admits of the canes being adjusted to any desired angle, and the plashing can be more conveniently and economically adapted to the varied spaces between the canes, the ends of such bracing strands or wires not being restricted to any particular limit. Hitching-posts, too, are dispensed with, for the separate wires and the whole construction answers the threefold purpose, first, of adjusting and holding said canes in their desired inclined positions by pressure at their roots, which is a great advantage; secondly, of forming a substitute for a horizontal rail or strand, and, thirdly, as forming a diagonal lattice or plashing work for turning small stock. The plants will soon send out numerous branches that will interlace and give ample permanence to the loose ends of said wires.

To stiffen the top line of the canes, I pass or plash through between and with them, alternately on opposite sides of them at or near their upper ends, a horizontal railing or strand C, formed preferably of stiff non-flexible wire rods, and permanently tie thereto the top ends of each of the canes with tarred or other water-proof cords *d*, or wire, if preferred. Said upper railing or strand C is made up in sections, with splicing loops or connections *e* at their ends, whereby they are stiffly interlocked with one another. By this railing or strand a continuous stiff connection is made with the line of fence, and in case of a long stretch of such railing, hitched to permanent hitching-posts, which might sometimes be preferred, said strand would adapt itself to various temperatures of the weather, operating to expand or contract the sections. The sectionally-constructed strand C may be made of any suitable kind or shape of stiffening-iron. At a suitable distance below this top stiffening-strand C, I prefer to use one, or it might be more, horizontal strands of barbed wire D, which I simply pass through between and alternately on opposite sides of the canes, without fastening them thereto otherwise than by their contact with the protruding stubs or thorns. If desired, such strand D may also be supplied in sections and be united by any suitable clasps or fastenings not permanently plashed in with the bracing-strands.

Instead of the sectionally-constructed parts being united where meeting, as by loops e, they might be united with each other at either or both of their adjacent ends by tying them together either with wire f or tarred rope g, as shown in Figs. 3 and 4 of the drawings. By this construction of a plashed fence and making the braces and strands in sections independently connected with each other a passage through a long stretch of fence may readily be made, when required, without injury to the plashed work by simply disconnecting a section of the horizontal strands and detaching the hooked braces.

While wire may be used for tying the tops of the canes to the upper railing or strand, I prefer to use tarred or other water-proof cord, inasmuch as it is much more convenient and cheaper than wire-tying, and sufficiently durable until the fence becomes thoroughly perfected by the outgrowing branches of the canes interlacing with said railing or strand. Such tying of the tops of the canes at their tops would be comparatively harmless, even though the bark were cut through and life destroyed at such parts, as the latter would soon be replaced by the outgrowth of side branches, and these would in course of time be amply sufficient to interlace and hold fast the railing or strand which first depended upon such tying.

By applying the hooks of the bracing-strands B to the roots of the cane near the surface of the ground the same is not only a simple means of attachment, but of bending the canes at their roots, and also of checking by the pressure of the hooks the flow of sap on their under sides for the purpose of increasing it upon the upper portions of the canes, and this will have the tendency to start out new branches near the ground, which is very essential to perfect hedge-plashing, it being the nature of plants or trees to throw out their branches on their upper parts, where the sap is most free to circulate. The pressure of the upper portions of these braces B also holds the canes down, and has the effect of checking or holding back the free flow of sap and inducing the more prolific growth of the branches below or near the ground, where they are most required.

Special advantages are gained in this mode of plashing, inasmuch as all the parts can be previously prepared or manufactured by mechanical methods and then conveniently and quickly applied in the plashing process, thus greatly facilitating and cheapening the plashing work, which in former systems has been very inconvenient and cumbersome. My improved system also provides for the plashing being done more efficiently and more economically, and adapts the plashing to the varied spaces between the canes, the ends of the bracing-strands not being restricted to any particular limit.

Having thus described my invention, what I claim as new, and desire to secure by Letters Patent, is—

1. In a hedge fence, the combination, with the canes, of the horizontal rod or rail C, constructed in sections and having sliding spliced connections with each other, said canes having a fixed tie-connection at their ends with said rod C, substantially as and for the purpose described.

2. In plashed fences, the combination, with the canes A, of a series of independent and disconnected wire braces provided with hooks b, having an open end loosely engaging the canes below the surface of the ground, said braces running in oblique directions and passed alternately between the canes, the upper ends extended horizontally backward alternately between said canes in their required inclined positions, and the horizontal rod or rail C, constructed in sections having sliding connections with each other, as shown, substantially as and for the purpose specified.

PETER GEISER.

Witnesses:
  IKE B. RUSSELL,
  F. S. BRENISHOLZ.